(12) United States Patent
Bates et al.

(10) Patent No.: US 7,047,519 B2
(45) Date of Patent: May 16, 2006

(54) DYNAMIC SETTING OF BREAKPOINT COUNT ATTRIBUTES

(75) Inventors: Cary Lee Bates, Rochester, MN (US); Paul Reuben Day, Rochester, MN (US); Victor John Gettler, Lexington, KY (US)

(73) Assignee: International Business Machines Corporation, Armonk, NY (US)

( * ) Notice: Subject to any disclaimer, the term of this patent is extended or adjusted under 35 U.S.C. 154(b) by 724 days.

(21) Appl. No.: 09/964,237

(22) Filed: Sep. 26, 2001

(65) Prior Publication Data

US 2003/0061599 A1 Mar. 27, 2003

(51) Int. Cl.
*G06F 9/44* (2006.01)
*G06F 11/07* (2006.01)

(52) U.S. Cl. .................. 717/129; 717/131; 714/34
(58) Field of Classification Search ........ 717/124–130, 717/131; 714/34–35; 703/28
See application file for complete search history.

(56) References Cited

U.S. PATENT DOCUMENTS

| | | | | | |
|---|---|---|---|---|---|
| 4,080,650 | A | * | 3/1978 | Beckett .................. | 717/129 |
| 5,050,168 | A | * | 9/1991 | Paterson .................. | 714/35 |
| 5,321,828 | A | * | 6/1994 | Phillips et al. ............ | 703/28 |
| 5,367,550 | A | * | 11/1994 | Ishida .................... | 377/39 |
| 5,754,839 | A | * | 5/1998 | Pardo et al. ............. | 712/227 |
| 5,774,724 | A | * | 6/1998 | Heisch .................. | 717/129 |
| 5,875,294 | A | * | 2/1999 | Roth et al. .............. | 714/39 |
| 6,154,857 | A | * | 11/2000 | Mann .................... | 714/30 |
| 6,182,208 | B1 | * | 1/2001 | Peri et al. ............... | 712/227 |
| 6,493,868 | B1 | * | 12/2002 | DaSilva et al. ........... | 717/105 |
| 6,751,751 | B1 | * | 6/2004 | Murray et al. ............ | 714/34 |
| 6,795,964 | B1 | * | 9/2004 | Ramasamy et al. ......... | 717/130 |

OTHER PUBLICATIONS

Susan L. Graham, Peter B. Kessler, Marshall K. Mckusick, "Gprof: A call graph execution profiler", Jun. 1982, ACM SIGPLAN Notices , Proceedings of the 1982 SIGPLAN symposium on Compiler construction, vol. 17 Issue 6, pp. 120-126.*
Wahbe et al. "Practical Data Breakpoints: Design and Implementation", 1993, Proceedings of the ACM SIGPLAN 1993 Conference on PLDI, pp. 1-12.*

* cited by examiner

*Primary Examiner*—Tuan Dam
*Assistant Examiner*—J. Derek Rutten
(74) *Attorney, Agent, or Firm*—Patterson & Sheridan (57) ABSTRACT

Apparatus, methods and articles of manufacture are provided for tracking breakpoint hits. In one embodiment, a hit count is automatically incremented for each breakpoint. The hit count is stored for subsequent runs, thereby allowing a user to specify a breakpoint encounter number, N, to which a program may execute and then stop. Illustratively, each breakpoint encounter may have been automatically tracked prior to the user's specification of N. In another embodiment, a range in which the breakpoint is located is specified. The hit count is incremented for each encounter of the breakpoint in the range and reset each time the range is entered.

23 Claims, 8 Drawing Sheets

| BREAKPOINT TABLE | | | | | | |
|---|---|---|---|---|---|---|
| ADDRESS | LINE # | OP CODE | CONDITION | STOP COUNT | COUNT RESET ID | RANGE COUNTER LIST |
| CF007652 | 12 | LOAD | | ID=3 STOP COUNT=4 | | ID=1 COUNT=0, ID=2 COUNT=0, ID=3 COUNT=0 |
| CF007603 | 2 | CLR | | | 1 | |
| CF007613 | 6 | CLR | | | 2 | |
| CF007625 | 10 | CLR | | | 3 | |
| CF007870 | 30 | CALL | I==4 | | 10 | |
| ⋮ | | | | | | |

```
001  foo()
002  {
003     int i,j,k;
004
005     i = 0:
006     for( i = 0: i < 32: i++ )
007     {
008
009        k = i * 2:
010        for ( j = i ; j < 50; j++ )
011        {
012           k = k + j;
013           foo2( k, j ):
014        }
015     }
016
017     return;
018  }
019
020
021
022
023  main()
024  {
025  int i;
026
027     for ( i = 0; I < 10; i++ )
028     {
029
030        foo();
031     }
032
033  }
```

Fig. 1

RANGE TABLE 250A

| | START LINE (302) | END LINE (304) | ENTRY POS (306) | RANGE ID (308) |
|---|---|---|---|---|
| 310A | 2 | 18 | 2 | 1 |
| 310B | 7 | 15 | 6 | 2 |
| 310C | 11 | 14 | 10 | 3 |
| 310D | 001 | 033 | 024 | 4 |
| 310E | 028 | 031 | 027 | 5 |
| | | | | |

DYNAMIC SETTING OF BREAKPOINT COUNT ATTRIBUTES

BACKGROUND OF THE INVENTION

1. Field of the Invention

The present invention generally relates to data processing. More particularly, embodiments are provided for tracking breakpoint hits in a program being debugged.

2. Description of the Related Art

Inherent in any software development technique is the potential for introducing "bugs". A bug will typically cause unexpected results during the execution of the program. Locating, analyzing, and correcting bugs in a computer program is a process known as "debugging." Debugging of programs may be done either manually or interactively by a debugging system mediated by a computer system. Manual debugging of a program requires a programmer to manually trace the logic flow of the program and the contents of memory elements, e.g., registers and variables. In the interactive debugging of programs, the program is executed under the control of a monitor program (known as a "debugger"). The debugger may be located on and executed by the same computer system on which the program is executed or may be located on a different system from the one the program is executed on, in the case of a distributed debugger.

Conventional debuggers typically support various operations to assist a computer programmer. Each operation allows the programmer to examine the state of program registers and variables at a given point in the execution of a program. A common operation supported by conventional debuggers is a breakpoint operation. A "breakpoint" is a point in the program where execution of the computer program is stopped so that the state of the program can be examined by a computer programmer. As a result, when a computer program is executed by a debugger, the program executes in a normal fashion until a breakpoint is reached. The debugger then stops execution and displays the results of the computer program to the programmer for analysis.

One problem with conventional debuggers is controlling when breakpoints are hit. In a common debugging scenario, a breakpoint in a program is encountered N number of times before arriving at a particular location (e.g., a location at which a programmer intends to begin serious debugging). Often, the programmer desires to return to this location/state in the program when the program is started with different data. To address this need, many modern debuggers can be instructed to break every N times a particular breakpoint is hit (e.g., every seventh time). However, this requires the programmer to count the number of times the breakpoint was hit during a test run. The programmer may not have been aware ahead of time of the need to count breakpoint hits, or the act of counting breakpoints is simply too cumbersome or error prone to be considered practical by the programmer. As a result, this breakpoint feature is underutilized in most debuggers.

Therefore, a need exists for controlling when breakpoints are hit in a debugging environment.

SUMMARY OF THE INVENTION

Apparatus, methods and articles of manufacture are provided for tracking breakpoint hits and assigning (automatically and/or manually) stop counts relative to another position or state in a program. One embodiment provides a method of debugging an application in a debugging environment comprising the application and a debugger program. The method comprises automatically counting a number of times each breakpoint in the application is encountered while the application is executing during a test run; and storing the number for each breakpoint in a memory space for use in a subsequent run. Another embodiment provides a computer readable medium containing a debug program which, when executed by a computer configured with an application being debugged, performs the foregoing method.

In another embodiment, a method of debugging an application comprises associating a counter with a breakpoint and with at least one application code segment in which the breakpoint is located; incrementing the counter each time the breakpoint is encountered; and resetting the counter each time the application code segment is entered. Another embodiment provides a computer readable medium containing a debug program which, when executed by a computer configured with an application being debugged during a debug session, performs the foregoing method.

In yet another embodiment, a computer system is provided which is configured to perform any of the foregoing methods.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Apparatus, methods and articles of manufacture are provided for tracking breakpoint hits and assigning (automatically and/or manually) stop counts relative to another position or state in a program. As described above, a breakpoint is a point in a computer program where execution of the program is stopped so that the state of the program can be examined by a computer programmer. As a result, when a computer program is executed by a debugger, the program executes in a normal fashion until a breakpoint is reached. The debugger then stops execution and displays the results of the computer program to the programmer for analysis.

The breakpoints used to advantage by the present embodiments may be unconditional or conditional. Unconditional means that once such a breakpoint is reached, execution of the program is always halted. Conditional breakpoints only halt execution of a program when a variable used by the program is set to a predetermined value at the time such a breakpoint is reached.

In addition, internal breakpoints are used to advantage. Internal breakpoints are breakpoints which, when hit, cause some processing to occur but do not call a user interface. For example, in some embodiments, a counter is incremented. Internal breakpoints may be set manually or automatically. Internal breakpoints will be described in more detail below. For clarity, references herein to "a breakpoint" do not refer to internal breakpoints, but rather to conventional breakpoints that result in calling a user interface. In contrast, internal breakpoints will be referred to as "internal breakpoints", "reset counter breakpoints" or "internal reset counter breakpoints".

In some embodiments, a user instructs a debugger to execute a program being debugged until an Nth occurrence of a particular breakpoint. In such embodiments, the user is not burdened with having to first count the number of occurrences, N. Rather, the debugger is configured to implement counters which count the number of times (N) a breakpoint is encountered during each test run. When the user identifies an interesting state or location of the program being debugged, the user need only instruct the debugger to initiate another run from the current location to the Nth occurrence of the last encountered breakpoint or to save the counter value and associated breakpoint information for future use. Accordingly, when the user then initiates the subsequent run (having specified to return to the Nth occurrence of a particular breakpoint), the debugger allows the program under debug to execute until the Nth occurrence of the breakpoint of interest. At the Nth occurrence, and not before, the breakpoint fires and the debugger gets control to stop execution.

In some cases, it may be desirable to return to an occurrence of a particular breakpoint before the last occurrence, such as where execution problems arise before the last breakpoint occurrence. Accordingly, a user may specify that the debugger is to return to the N–X occurrence of some breakpoint, where X is a user specified integer value of zero or greater. Again, the user need not specify a value for N or even know the value for N, since N is determined by the debugger during each test run using a counter.

In general, a counter may be configured to count the "absolute number" of breakpoint hits from the beginning of the program execution or a "relative number" of breakpoint hits relative to some designated program location or area (i.e., code segment). The program locations/areas for which a counter may be made relative to, are referred to herein as a "range". In one embodiment, one of several locations can be selected as the relative position or state from which to begin counting the "hit counts". One location is the current procedure entry, so that a breakpoint only fires on the Nth occurrence after the procedure entry is executed. Other locations include program entries and loop entries. In the case of program entries, a counter may be associated with a breakpoint such that the breakpoint only fires when a program is run again and the breakpoint is hit N number of times in the program. To implement loop entries, additional information is provided (e.g., by a compiler) so that the debugger is aware of the various loop entry locations. The additional information may include, for example, the line number and a label name(s) at the beginning and end of a loop. In one embodiment, the information is the information needed for a range table 250A, which will be described below. The user then establishes a breakpoint such that the breakpoint fires after being hit N number of times after the loop entry is executed.

Where a user desires to determine a relative number of breakpoints hits relative to some range, the counter is reset each time the particular range is re-entered. This is desirable because the state of the program may not be the same with iterative re-execution of the range code segment. Accordingly, the state of the program of interest to a user may be at the Nth encounter of a breakpoint relative to a particular predefined area (i.e., code segment), rather than simply at the absolute Nth encounter of the breakpoint. To this end, embodiments of the present invention provide internal breakpoints configured to reset a counter associated with the breakpoint the user desires to monitor for encounters. In general, the counters and associated internal breakpoints may be set automatically or manually. In addition to setting counters and associated internal breakpoints according to a predefined area/range, the counters and internal breakpoints may be defined relative to program locations and conditional expressions. For example, a conditional expression X>50 may be specified such that counting breakpoint hits begins at some location where the conditional expression is true. As another example, a user may stipulate that a breakpoint count for some particular breakpoint is incremented only if some other breakpoint in this or another range has reached some specified count value.

Further, embodiments are not limited by the need to automatically calculate the Nth occurrence of a breakpoint. As such, the mere stipulation of a range is considered inventive. A user may then configure the debugger to run to the Nth occurrence of a breakpoint within the specified range, whether or not N has been previously calculated by the debugger.

Figure 1:
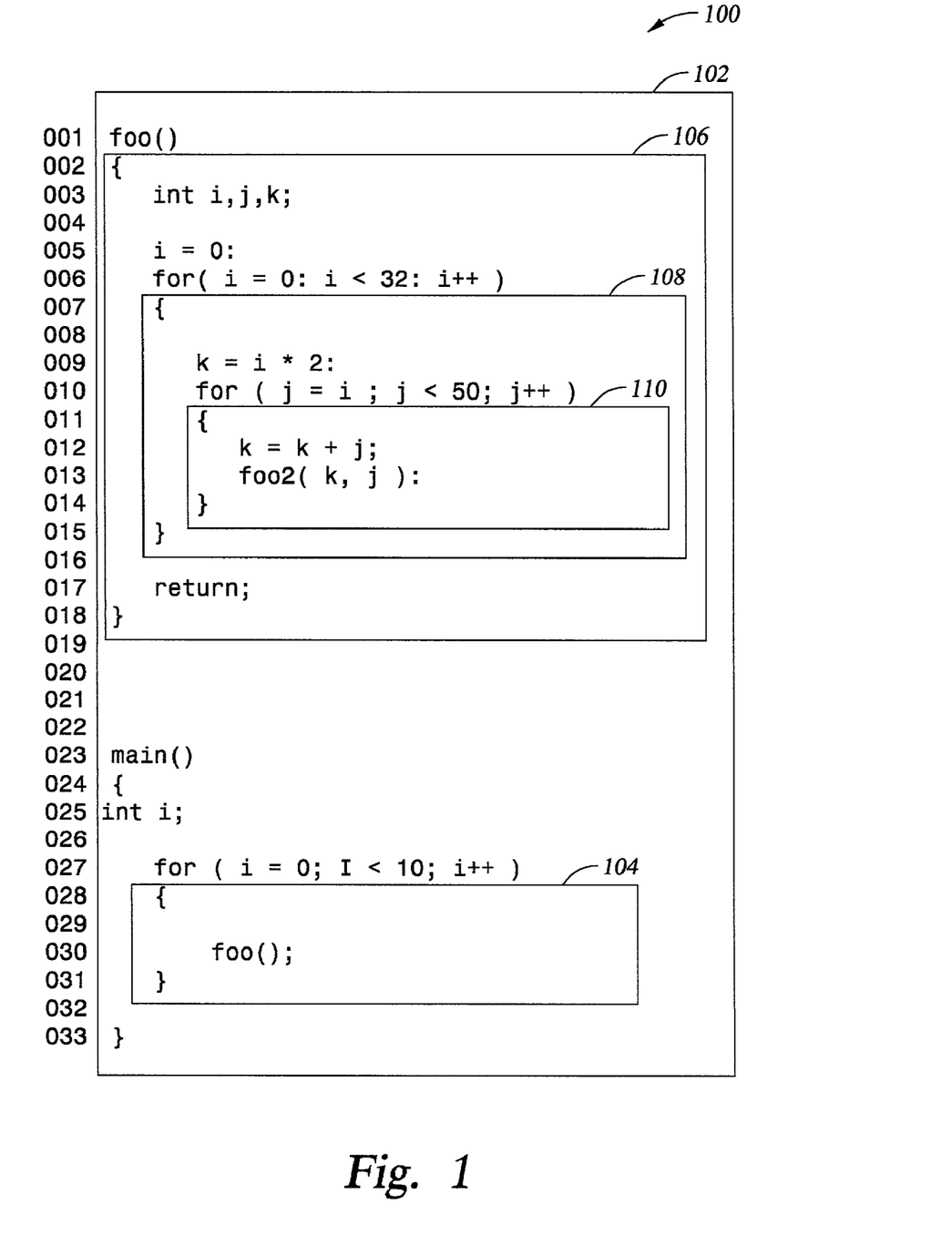
FIG. 1 illustrates code of an application being debugged and illustrates ranges having associated counters.

The concept of a "range", as well as each of the other foregoing embodiments, may be further described and understood with reference to FIG. 1 which shows illustrative code 100 of a program. In general, the code 100 includes a main routine (entered at line 023), a routine foo (entered at line 001) and a routine foo2 (called from routine foo at line 013). A number of ranges are defined by the main routine and routine foo. Specifically, the main routine defines a first range 102 comprising the entire code 100 and a second range 104 defined by a for-loop (entered at line 028). The entirety of routine foo defines a third range 106 and further comprises a pair of loops which define a fourth loop 108 (entered at line 007) and a fifth loop 110 (entered at line 011), respectively.

An internal breakpoint may be set at each range entry point. Specifically, an internal breakpoint may be located at line 024 (entry to the first range 102), line 028 (entry to the second range 104), line 002 (entry to the third range 106), line 007 (entry to the fourth range 108), and line 011 (entry to the fifth range 110). Each internal breakpoint may be configured to reset a counter associated with a user specified breakpoint. In general, the provision of internal breakpoints is determined by the location of the user specified breakpoint. By way of illustration, assume that a user specified breakpoint is set at line 012. In this case, four ranges (i.e., 102,106,108 and 110) are relevant with respect to the position of the user specified breakpoint. That is, the user specified breakpoint is contained within the aforementioned three ranges. As such, an internal breakpoint and associated counter may be established for each of the ranges (102,106, 108 and 110). Which relevant ranges to "activate" may be user configurable. It should be noted that, while considered a relevant range, the main routine is not a code "segment" which can be exited and then reentered during a single test run. As such, the main routine is always "active".

One embodiment of the invention is implemented as a program product for use with a computer system such as, for example, the computer system 210 shown in FIG. 2 and described below. The program(s) of the program product defines functions of the embodiments (including the methods described below) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, whether implemented as part of an operating system or a specific application, component, program, module, object, or sequence of instructions may be referred to herein as a "program". The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Moreover, those skilled in the art will appreciate that embodiments may be practiced with other computer system configurations including hand-held devices, multiprocessor systems, microprocessor-based or programmable consumer electronics, minicomputers, mainframe computers and the like. The embodiments may also be practiced in distributed computing environments where tasks are performed by remote processing devices that are linked through a communications network. In a distributed computing environment, program modules may be located in both local and remote memory storage devices.

Figure 2:
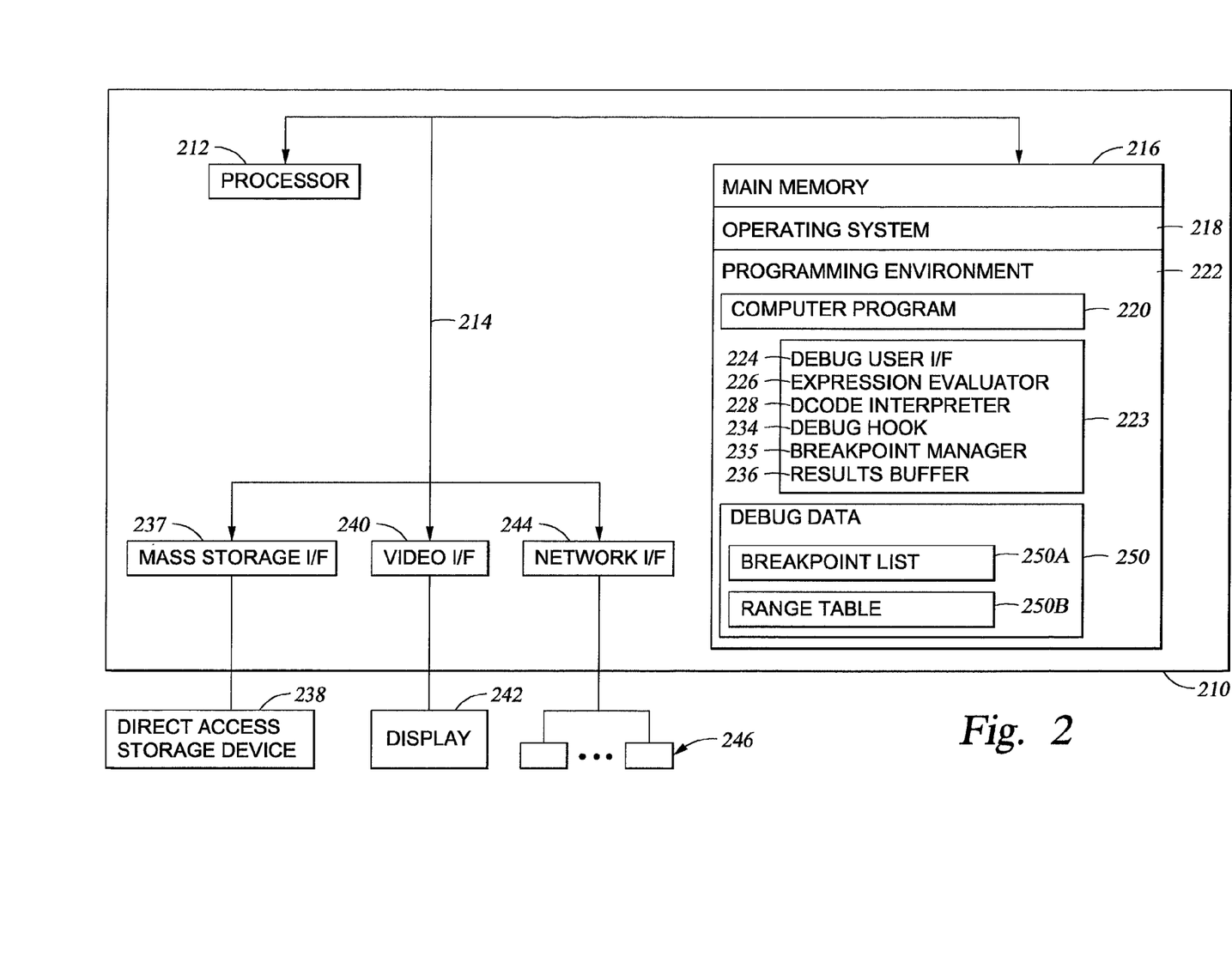
FIG. 2 is a high-level diagram of a computer system.

Referring now to FIG. 2, a computer system 210 consistent with the invention is shown. Computer system 210 may represent any type of computer, computer system or other programmable electronic device, including a client computer, a server computer, a portable computer, an embedded controller, etc. The computer system 210 may be a standalone device or networked into a larger system. In one embodiment, the computer system 210 is an eServer iSeries 400 computer available from International Business Machines Corporation of Armonk, N.Y.

The computer system 210 could include a number of operators and peripheral systems as shown, for example, by a mass storage interface 237 operably connected to a direct access storage device 238, by a video interface 240 operably connected to a display 242, and by a network interface 244 operably connected to a plurality of networked devices 246. The display 242 may be any video output device for outputting a user interface. The networked devices 246 could be desktop or PC-based computers, workstations, network terminals, or other networked computer systems.

Computer system 210 is shown comprising at least one processor 212, which obtains instructions, or operation codes, (also known as opcodes), and data via a bus 214 from a main memory 216. The processor 212 could be any processor adapted to support the debugging methods, apparatus and article of manufacture of the invention. In particular, the computer processor 212 is selected to support monitoring of memory accesses according to user-issued commands. Illustratively, the processor is a PowerPC available from International Business Machines Corporation of Armonk, N.Y.

The main memory 216 could be one or a combination of memory devices, including Random Access Memory, non-volatile or backup memory, (e.g., programmable or Flash memories, read-only memories, etc.). In addition, memory 216 may be considered to include memory physically located elsewhere in a computer system 210, for example, any storage capacity used as virtual memory or stored on a mass storage device or on another computer coupled to the computer system 210 via bus 214.

The main memory 216 generally includes an operating system 218 and a programming environment 222. The programming environment 222 comprises a computer program 220 to be debugged (illustratively, the code 100 shown in FIG. 1 is all or part of computer program 220), a debugger program 223 and debug data 250. In one embodiment, the debug data 250 includes a range table 250A and a breakpoint table 250B.

The programming environment 222 facilitates debugging the computer program 220, or computer code, by providing tools for locating, analyzing and correcting faults. One such tool is the debugger program 223 (also referred to herein as the debugger). In one embodiment, the debugger 223 is a VisualAge for C++ for OS/400 debugger modified according to the invention. VisualAge for C++ for OS/400 is available from International Business Machines Corporation of Armonk, N.Y.

Although the software constructs, such as the computer program 220 and the debugger 223, are shown residing on the same computer, a distributed environment is also contemplated. Thus, for example, the debugger 223 and the debug data 250 may be located on a networked device 246, while the computer program 220 to be debugged is on the computer system 210.

In a specific embodiment, the debugger 223 comprises a debugger user interface 224, expression evaluator 226, Dcode interpreter 228 (also referred to herein as the debug interpreter 228), debugger hook (also known as a stop handler) 234, a breakpoint manager 235 and a results buffer 236. Although treated herein as integral parts of the debugger 223, one or more of the foregoing components may exist separately in the computer system 210. Further, the debugger may include additional components not shown.

A debugging process is initiated by the debug user interface 224. The user interface 224 presents the program under debugging and highlights the current line of the program on which a stop or error occurs. The user interface 224 allows the user to set control points (e.g., breakpoints and watch points), display and change variable values, and activate other inventive features described herein by inputting the appropriate commands. In some instances, the user may define the commands by referring to high-order language (HOL) references such as line or statement numbers or software object references such as a program or module name, from which the physical memory address may be cross referenced.

The expression evaluator 226 parses the debugger command passed from the user interface 224 and uses a data structure (e.g., a table) generated by a compiler to map the line number in the debugger command to the physical memory address in memory 216. In addition, the expression evaluator 226 generates a Dcode program for the command. The Dcode program is machine executable language that emulates the commands. Some embodiments of the invention include Dcodes which, when executed, activate control features described in more detail below.

The Dcode generated by the expression evaluator 226 is executed by the Dcode interpreter 228. The interpreter 228 handles expressions and Dcode instructions to perform various debugging steps. Results from Dcode interpreter 228 are returned to the user interface 224 through the expression evaluator 226. In addition, the Dcode interpreter 228 passes on information to the debug hook 234, which takes steps described below.

After the commands are entered, the user provides an input that resumes execution of the program 220. During execution, control is returned to the debugger 223 via the debug hook 234. The debug hook 234 is a code segment that returns control to the appropriate user interface. In some implementations, execution of the program eventually results in an event causing a trap to fire (e.g., a breakpoint or watchpoint is encountered). Control is then returned to the debugger by the debug hook 234 and program execution is halted. The debug hook 234 then invokes the debug user interface 224 and may pass the results to the user interface 224. Alternatively, the results may be passed to the results buffer 236 to cache data for the user interface 224. In other embodiments, the user may input a command while the program is stopped, causing the debugger to run a desired debugging routine. Result values are then provided to the user via the user interface 224.

Figure 3:
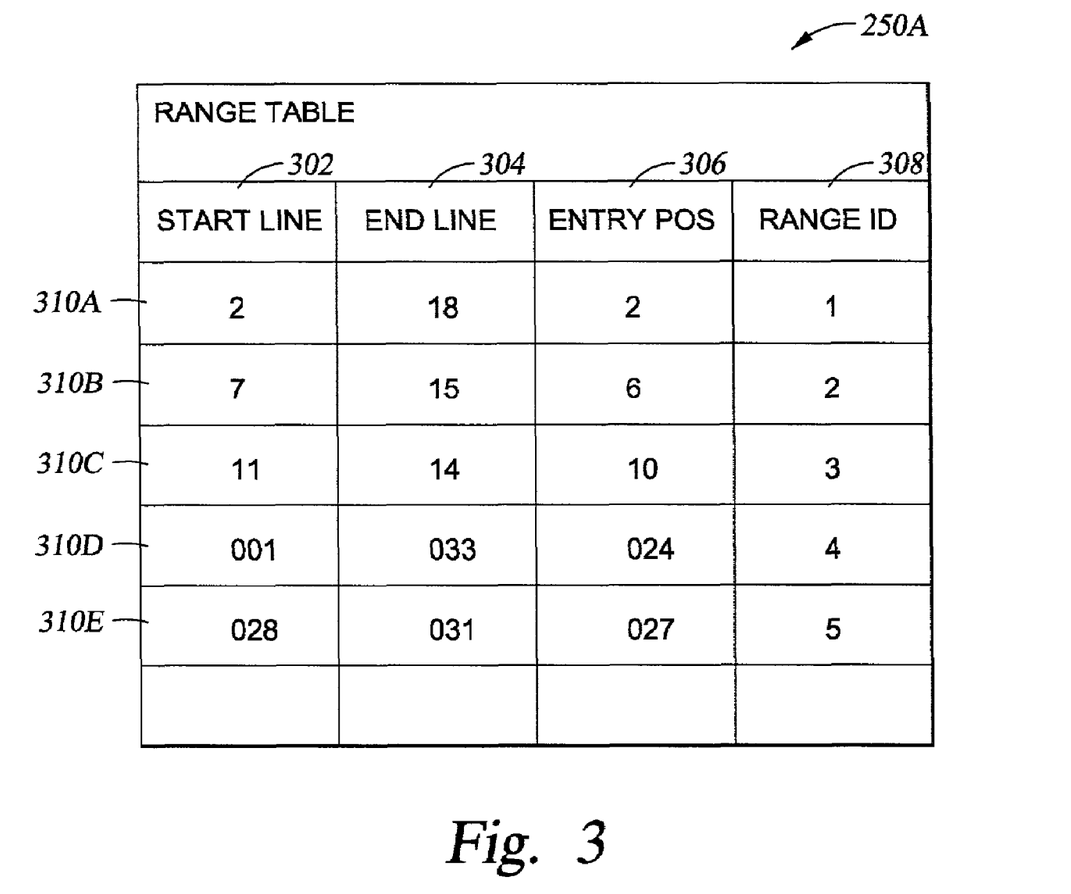
FIG. 3 is a range table.

FIG. 3 shows one embodiment of the range table 250A. In one embodiment, the range table 250A is generated by a compiler and is generally configured as a plurality of columns and rows, where each row defines a record. Specifically, the range table 250A comprises a start line column 302, and end line column 304, an entry position column 306 and a range identifier (ID) column 308. The start line column 302 and end line column 304 contain the line numbers on which a range begins and ends, respectively. The entry position for a particular range (which is where an internal counter reset breakpoint is set) is indicated in the entry positions column 306. Each range is assigned an identifier contained in the range ID column 308. By way of illustration, the range table 250A shown in FIG. 3 is populated with information representative of the code 100 shown in FIG. 1. Thus, a first record 310A is provided for the routine foo, a second record 310B is provided for the first for-loop of the routine foo, a third record 310C is provided for the second for-loop of the routine foo, a fourth record 310D is provided for the main routine and a fifth record 310E is provided for the loop calling the routine foo from the main routine.

Figure 4:
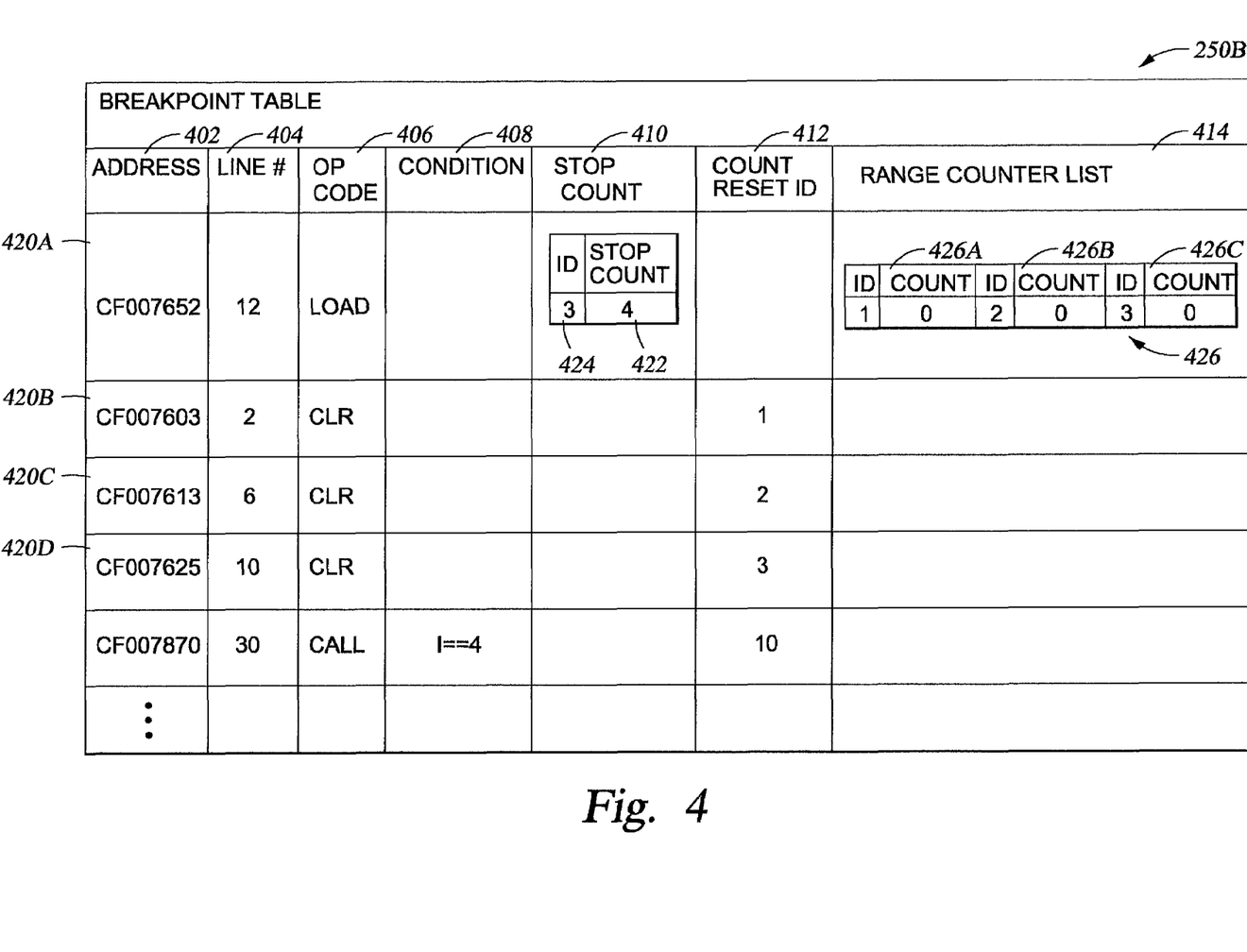
FIG. 4 is a breakpoint table.
Figure 5A:
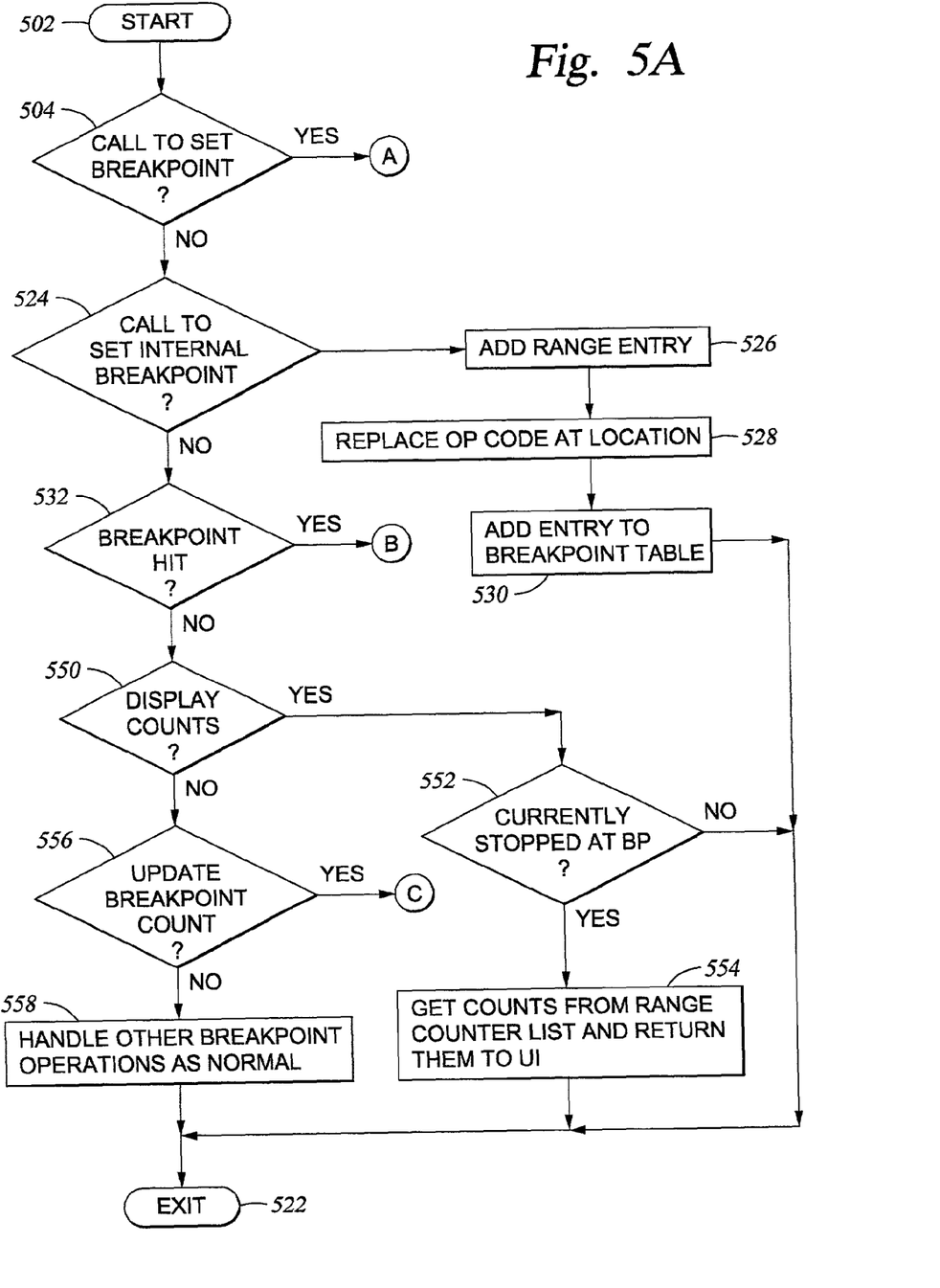
FIG. 5 is a flow chart illustrating the operation of a debug hook.
Figure 5B:
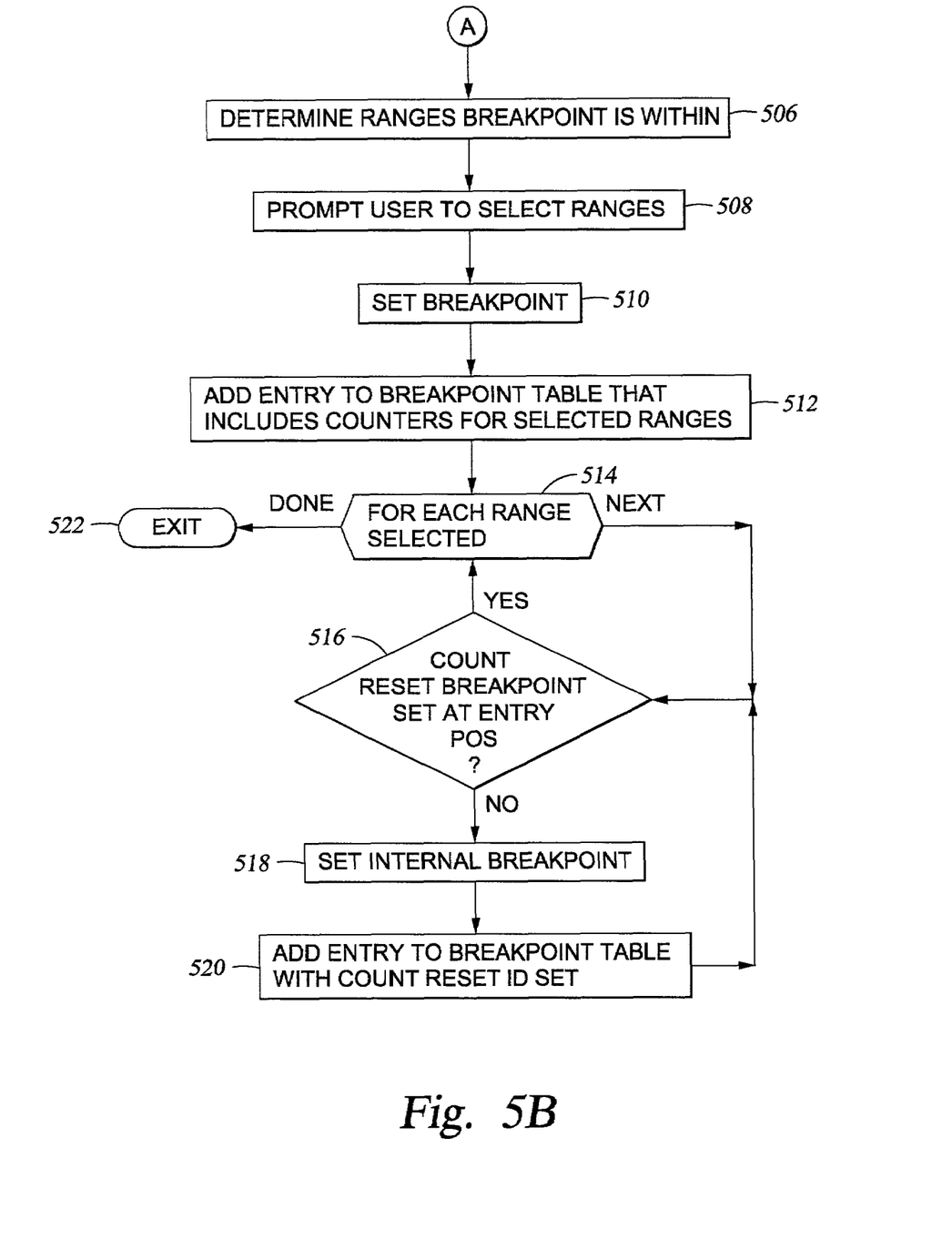
Figure 5C:
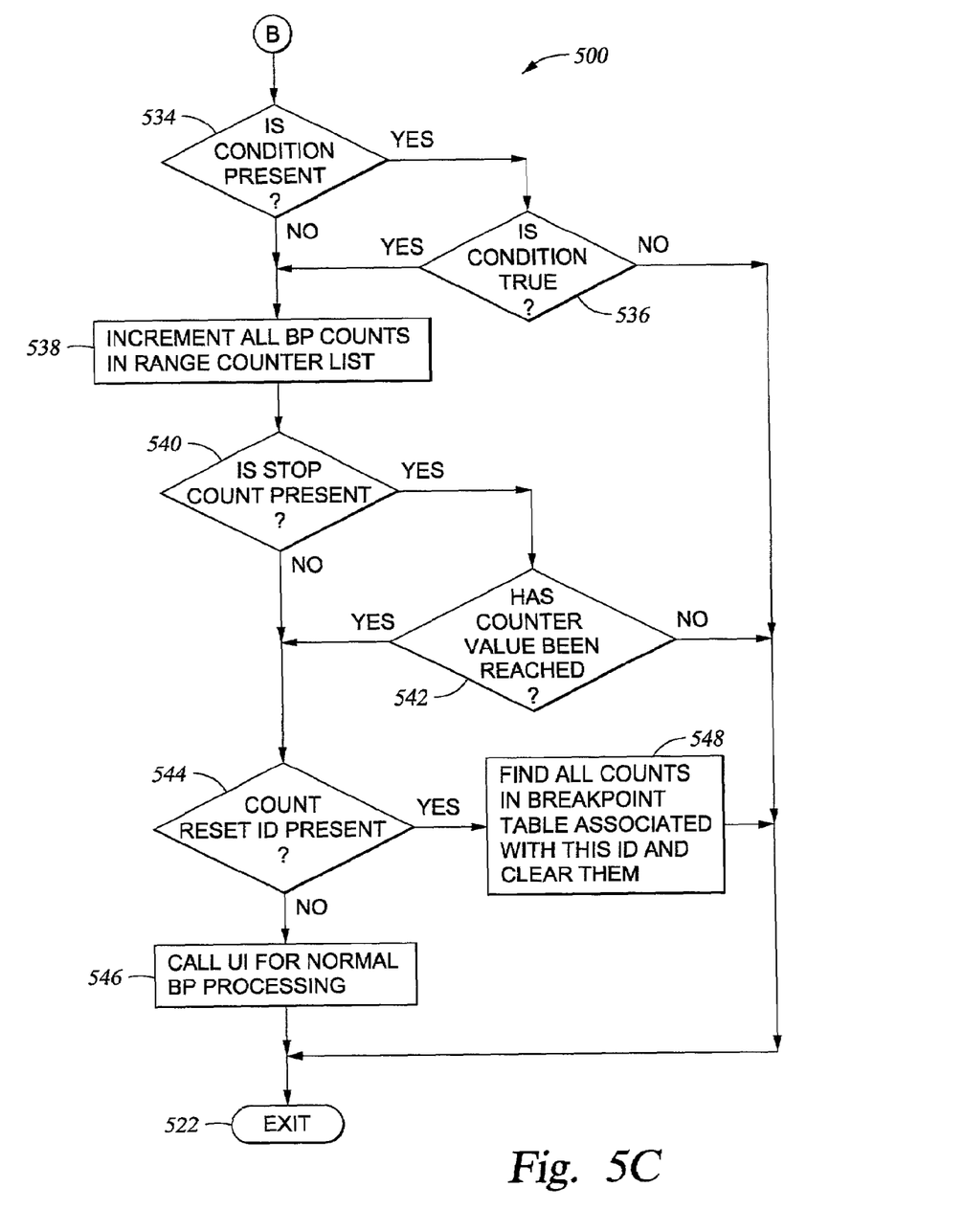
Figure 5D:
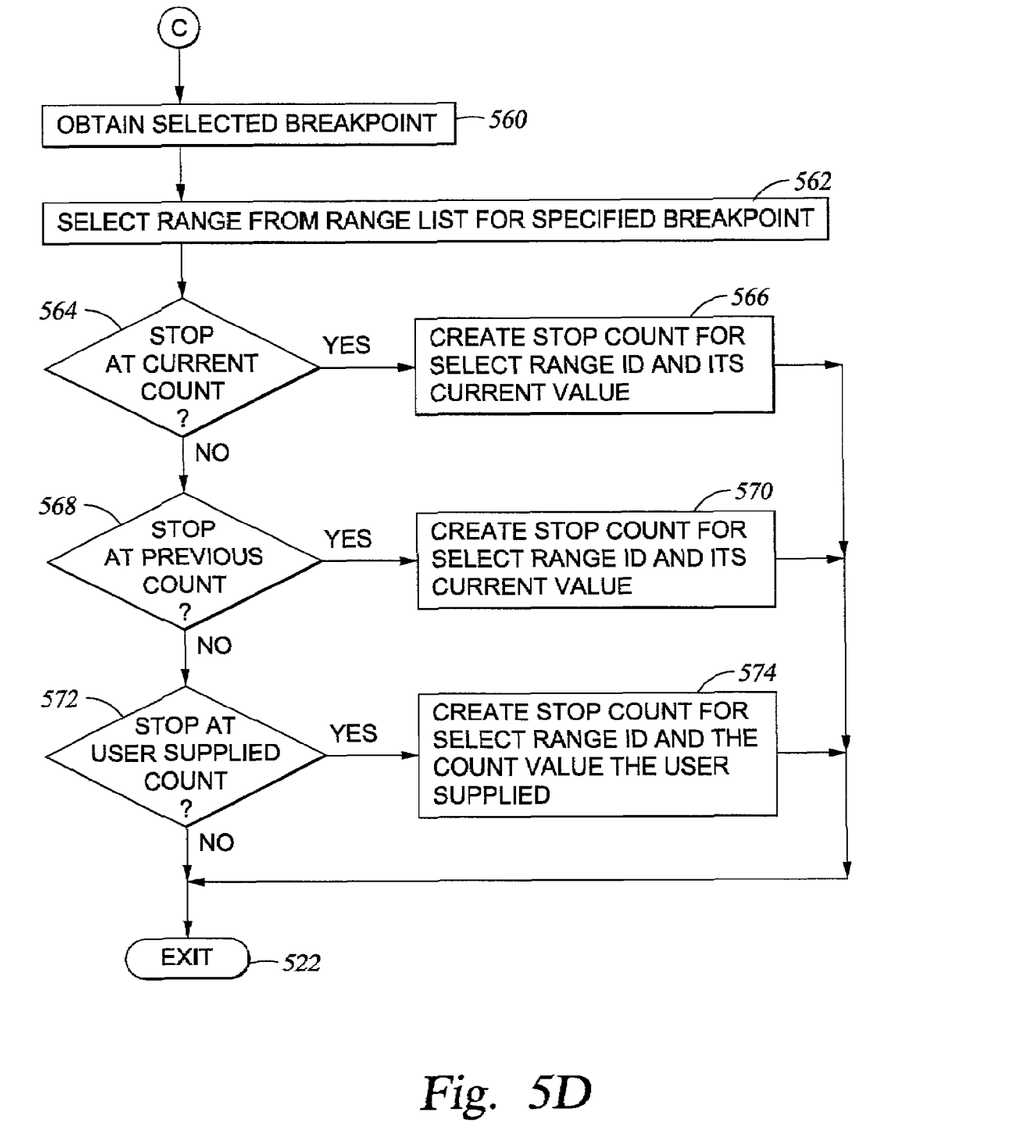

FIG. 4 shows one embodiment of the breakpoint table 250B. In general, the breakpoint table 250B provides some aspects which are well-known in the art in combination with some inventive features. For example, as is well-known, an address column 402, a line number column 404 and an opcode (operation code) column 406 are shown. The information contained under the address column 402 specifies a memory location of a breakpoint. The information contained under the line number column 404 specifies a line number in the computer program 220 at which the breakpoint is located. The information contained under the opcode column 404 specifies the original operation code of the program which has been replaced with some "bad" operation code to cause an interrupt and make the break occur in the code.

The breakpoint table 250B is further configured with a condition column 408, a stop count column 410, a counter reset ID column 412 and a range counter list column 414. The entries of the condition column 408 contain user specified conditions which must be met before the associated breakpoint fires. The stop count column 410 allows the user or system to specify an Nth occurrence of a breakpoint at which to stop execution for a specified range. The entries of the counter reset ID column 412 contain the appropriate range ID from the range table 250A for each internal breakpoint. The entries of the range counter list column 414 contain a range counter list 426. The range counter list 426 contains a counter for each user-selected range. Illustratively, the range counter list 426 for a first record 420A contains three counters 426A–C.

The breakpoint table 250B is populated with information representative of a situation in which the code 100 (FIG. 1) is being debugged. Accordingly, a first record 420A is configured for a user-specified breakpoint set at line 012. A stop count entry of the first record 420A is configured with a stop count value 422 of four for the range associated with a range ID value 424 of three (i.e., the range 110). Illustratively, the range counter list 426 of the first record 420A under the column 414 contains three counters 426A–C associated with the user-selected ranges 106,108 and 110, respectively. Each of the user-selected ranges is configured with an internal breakpoint which resets the associated counter for the range. As a result, records 420B–D are configured for internal breakpoints for the ranges 106,108 and 110, respectively. A fifth record 420E is representative of a manually set internal breakpoint which, as yet, is not associated with a conventional breakpoint.

Referring now to FIG. 5, a method 500 is shown illustrating the operation of the debugger hook 234. Persons skilled in the art will recognize that the chronology of steps is merely illustrative and may be varied. The method 500 is entered at step 502 upon receiving an event for processing. At step 504 the method 500 queries whether the event is to set a breakpoint. If so, the method 500 determines the ranges that the breakpoint is within at step 506. This may be done with reference to the range table 250A which has been created by a compiler. The user is then prompted (e.g., via a graphical user interface) to select one or more of the determined ranges at step 508. The breakpoint is set at step 510 (i.e., the opcode is replaced at the breakpoint location). Continuing with the example from above, a breakpoint is set at line 012 of the code 100 (shown in FIG. 1) and a record (e.g., record 420A) of the breakpoint table 250B is populated with the appropriate breakpoint information (i.e., address, line number, opcode). At step 512, counters 426 for each of the selected ranges are then added to the record for the breakpoint set at step 510.

Processing then enters a loop at step 514 for each selected range to determine whether an internal breakpoint must be set for each counter 426 added to the breakpoint table 250B at step 512. Accordingly, at step 516 the method 500 queries whether an internal breakpoint is already set at the entry position for a given user-selected range. This may be done by retrieving, from the range table 250A, the range ID for the particular entry position and then using the range ID to index into the breakpoint table 250B. If step 516 is answered affirmatively, processing returns to step 514 where the next range is selected for processing. Otherwise, processing proceeds to step 518 where an internal breakpoint is set at the entry position of the range being processed. At step 520, a record is then added to the breakpoint table 250B for the internal breakpoint set at step 518. Once each of the user selected ranges has been processed, the method 500 exits at step 522.

Returning to step 504, if the event is not to set a breakpoint, processing proceeds to step 524 where the method 500 queries whether the event is a call to manually set an internal breakpoint. If so, a range entry for the internal breakpoint is added to the range table 250A at step 526. Illustratively, the range may specify the full range of the code being debugged or may be a user selected range. At step 528, the internal breakpoint is set by replacing the opcode at the specified location. At step 530, an entry for the internal breakpoint is added to the breakpoint table 250B. The method 500 then exits at step 522.

If the query at step 524 is answered negatively, processing proceeds to step 532 where the method 500 queries whether a breakpoint (conventional or internal) has been encountered. If so, processing proceeds to step 534 to determine whether a condition is specified under the condition column 408 for the particular breakpoint encountered. If a condition has been specified, step 536 queries whether the condition is true. If not, the method 500 exits at step 522. If the condition is true, or if step 534 is answered negatively, processing proceeds to step 538 where any and all breakpoint counters of the range counter list 426 for the encountered breakpoint are incremented.

At step 540, the method 500 queries whether a stop count (contained in the stop count column 410) is present for the encountered breakpoint. If so, then the encountered breakpoint is a conventional breakpoint and step 542 queries whether the counter value has been reached. If the counter value has not been reached, the method 500 exits at step 522. Otherwise, processing proceeds to step 544 where the method 500 queries whether a count reset ID (in column 412) is present. If not, the user interface 224 is called at step 546 for breakpoint processing, including indicating to the user which breakpoint has been encountered a number of times specified by a counter value 422 (as determined at step 542). The method 500 then exits at step 522. If, however, a count reset ID is present at step 544, then the encountered breakpoint is an internal count reset breakpoint. In this case, processing proceeds from step 544 to step 548 where all counters in the breakpoint table 250B associated with the count reset ID are cleared. The method 500 and exits at step 522.

Returning to step 532, if the event is not a breakpoint encounter, processing proceeds to step 550 where the method 500 queries whether the event is to display counts. Such an event may be user initiated or may be automatic upon hitting a breakpoint. If step 550 is answered affirmatively, processing proceeds to step 552 which queries whether execution is currently stopped at a breakpoint. If not, the method 500 exits at step 522. Otherwise, processing proceeds to step 554 where the counts are retrieved from the range counter list 426 and returned to the user interface 224. The method 500 then exits at step 522.

Returning to step 550, if the event is not to display counts, the method 500 proceeds to step 556 and queries whether the event is to update a breakpoint count. If not, the method 500 proceeds to step 558 to handle normal breakpoint operations and then exits at step 522. If step 556 is answered affirmatively, the method 500 proceeds to step 560 where the user selected breakpoints are obtained. At step 562, the user selects a range (or ranges) from the range table 250A for the specified breakpoint. The user may then implement any of a variety of options, including those described above. Illustratively, the method 500 provides three options which are identified at steps 564, 568 and 572.

At step 564, the method 500 queries whether the user has elected to stop execution of the next run at the current count (N). If so, processing proceeds to step 566 where a stop count entry is added to the stop count column 410 of the breakpoint table 250B for the selected breakpoint and range. As described above, the stop count includes the selected range ID 424 and the current count value 422 for the selected range (which is retrieved from the appropriate counter in the range counter list 426 associated with the selected breakpoint). The method 500 then exits at step 522.

If step 564 is answered negatively then, at step 568, the method 500 queries whether the user has elected to stop execution of the next run at a previous count value (N–X). If so, processing proceeds to step 570 where a stop count entry is added to the stop count column 410 of the breakpoint table 250B for the selected breakpoint and range. In this case, the stop count value 422 is configured as N–X, where N is the current counter value in the range counter list 426 for the selected breakpoint and range and X is some positive integer value. The method 500 then exits at step 522.

If step 568 is answered negatively then, at step 572, the method 500 queries whether the user has elected to stop at a user supplied count. If so, processing proceeds to step 574 where a stop count entry is added to the stop count column 410 of the breakpoint table 250 for the selected breakpoint and range. In this case, the stop count value 422 is the user supplied stop count value. The method 500 then exits at step 522. The method 500 also exits at step 522 if step 572 is answered negatively.

It is understood that the foregoing is merely illustrative and that modified and additional embodiments are contemplated. In particular, having been presented with the inventive breakpoint counters and ranges, persons skilled in the art will readily identify a variety of functions within the scope of the invention. For example, in a number of the previous embodiments a range of interest was selected by the user from the range table 250A. In another embodiment, however, a range is automatically designated. Illustratively, the range is automatically set at the beginning of a test run. A determination that a test run is about to begin can be determined in a variety of ways, including detecting that the computer program 220 has returned to a main menu (or to a debug control menu), detecting that the computer program 220 has been popped from a call stack, etc.

In still another embodiment, a function is provided for saving breakpoint attributes (e.g., range information and counter values) into a file. The debugger can then read from the file in later runs to drive debug sessions, either in batch jobs or for applications running on servers. Such an approach is particularly advantageous for debugging those problems that occur only in batch or on server runs.

While the foregoing is directed to embodiments of the present invention, other and further embodiments of the invention may be devised without departing from the basic scope thereof, and the scope thereof is determined by the claims that follow.

What is claimed is:

1. A method of debugging an application in a debugging environment comprising the application and a debugger program, the method comprising:
   automatically counting a number of times each breakpoint in the application is encountered while the application is executing during a test run, wherein the number is increasing and, at any time during the test run, always reflects a current number of times a given breakpoint has been encountered during the test run and wherein counting the number is not limited by a predetermined number representative of a desired number of encounters of the given breakpoint; and storing the number for each breakpoint in a memory space for use in a subsequent run;

wherein automatically counting comprises, for each breakpoint:
(i) incrementing a breakpoint-specific counter each time a breakpoint associated with the breakpoint-specific counter is encountered in a particular code segment; and
(ii) resetting the breakpoint-specific counter each time the particular code segment is entered.

2. The method of claim 1, further comprising, while the application is stopped, receiving a user-input request to uninterruptedly execute the application until a user-specified breakpoint is encountered some number of times, N–X, where N is a stored number of times the user-specified breakpoint was encountered during the test run and X is a value equal to or greater than zero and less than N.

3. The method of claim 1, further comprising, after the application is stopped at a location in response to a last breakpoint encounter of a particular breakpoint encountered Y number of times at the last breakpoint encounter, receiving a user-input request to uninterruptedly execute the application until the application is again stopped at the location in response to encountering the particular breakpoint Y number of times.

4. A tangible computer readable storage medium containing a debug program which, when executed by a computer configured with an application being debugged during a debug session, performs breakpoint counter operations, the debug program comprising:

counting instructions for automatically counting a number of times each breakpoint in the application is encountered, wherein the number is increasing and, at any time, always reflects a current number of times a given breakpoint has been encountered and wherein counting the number is not limited by a predetermined number representative of a desired number of encounters of the given breakpoint; and storing instructions for storing the number for each breakpoint in a memory space for use in a subsequent run;

wherein the counting instructions, when executed:
(i) increment a breakpoint-specific counter each time a breakpoint associated with the breakpoint-specific counter is encountered in a particular code segment; and
(ii) reset the breakpoint-specific counter each time the particular code segment is entered.

5. The tangible computer readable storage medium of claim 4, wherein the debug program further comprises, execution instructions for uninterruptedly executing the application until a user-specified breakpoint is encountered N–X times, wherein the execution instructions are configured for execution in response to a user request specifying the user-specified breakpoint and a number of encounters N–X, where N is a stored number of times the particular breakpoint was encountered during the test run and X is a value equal to or greater than zero and less than N.

6. The tangible computer readable storage medium of claim 4, wherein the debug program further comprises, execution instructions for, after the application is stopped at a last stopped location of the test run in response to encountering a last encountered breakpoint Y number of times, processing a user-input request to uninterruptedly execute the application until the application is again stopped at the location in response to again encountering the last encountered breakpoint Y number of times.

7. A method of debugging an application in a debugging environment comprising the application and a debugger program, the method comprising:

associating a counter with a breakpoint and with at least one application code segment in which the breakpoint is located;

incrementing the counter each time the breakpoint is encountered, wherein the counter, at any time, always reflects a current number of times a given breakpoint has been encountered and wherein incrementing the counter is not limited by a predetermined number representative of a desired number of encounters of the given breakpoint; and resetting the counter each time the application code segment is entered.

8. The method of claim 7, further comprising storing a counter value of the counter for use in a subsequent execution of the application.

9. The method of claim 7, wherein resetting the counter comprises firing an internal breakpoint which does not call a user interface.

10. The method of claim 7, further comprising:
determining whether a counter value of the counter has reached a user-specified value; and if so, halting execution of the application and issuing a user notification indicative of the counter value.

11. The method of claim 7, further comprising:
uninterruptedly executing the application until a counter value of the counter has reached a user-specified value; and then halting execution of the application.

12. A tangible computer readable storage medium containing a debug program which, when executed by a computer configured with an application being debugged during a debug session, performs breakpoint counter operations, the debug program comprising counter instructions which, when executed:

associate a counter with a breakpoint and with at least one application code segment in which the breakpoint is located;

increment the counter each time the breakpoint is encountered, wherein the counter, at any time, always reflects a current number of times a given breakpoint has been encountered and wherein incrementing the counter is not limited by a predetermined number representative of a desired number of encounters of the given breakpoint; and reset the counter each time the application code segment is entered.

13. The tangible computer readable storage medium of claim 12, wherein the code segment is one of a routine and a loop.

14. The tangible computer readable storage medium of claim 12, wherein the debug program further comprises execution instructions for uninterruptedly executing the application until a counter value of the counter is equal to a user-specified value.

15. The tangible computer readable storage medium of claim 12, wherein the debug program further comprises, storing instructions for storing a counter value of the counter for use in a subsequent execution of the application.

16. The tangible computer readable storage medium of claim 12, wherein the debug program further comprises internal breakpoint setting instructions for setting an internal breakpoint configured to reset the counter without calling a user interface when the internal breakpoint is fired.

17. The tangible computer readable storage medium of claim 12, wherein the debug program further comprises counter value instructions for determining whether a counter value of the counter has reached a user-specified value and, if so, halting execution of the application and issuing a user notification indicative of the counter value.

18. The tangible computer readable storage medium of claim 12, wherein the debug program further comprises counter value instructions for allowing uninterrupted execution of the application until a counter value of the counter has reached a user-specified value and then halting execution of the application.

19. A computer system, comprising:
a memory containing content comprising at least a debug program to implement a debug session, a breakpoint table configurable with breakpoint-specific counters and an application for debugging; and a processor which, when executing at least a portion of the content during the debug session, is configured to:
associate a breakpoint-specific counter with a breakpoint and with at least one application code segment in which the breakpoint is located;
increment the counter each time the breakpoint is encountered, wherein the counter, at any time, always reflects a current number of times a given breakpoint has been encountered and wherein incrementing the counter is not limited by a predetermined number representative of a desired number of encounters of the given breakpoint; and
reset the counter each time the application code segment is entered.

20. The computer system of claim 19, wherein the debug program, when executed by the processor, configures the processor to store a counter value of the breakpoint-specific counter in the breakpoint table for use in an execution of the application.

21. The computer system of claim 19, wherein the debug program, when executed by the processor, configures the processor to set an internal breakpoint configured to reset the breakpoint-specific counter without calling a user interface when the internal breakpoint is fired.

22. The computer system of claim 19, wherein the debug program, when executed by the processor, configures the processor to uninterruptedly execute the application until a counter value of the breakpoint-specific counter is equal to a user-specified value.

23. The computer system of claim 20, wherein the debug program, when executed by the processor, configures the processor to issue a user notification indicative of the counter value.

* * * * *